United States Patent [19]

Palmer et al.

[11] Patent Number: 5,189,531
[45] Date of Patent: Feb. 23, 1993

[54] HOLOGRAM PRODUCTION

[75] Inventors: Charles E. Palmer, Mamaroneck, N.Y.; Barry J. Taylor, Guetersloh, Fed. Rep. of Germany; August DeFazio, 33 Forman La., Englishtown, N.J. 07726

[73] Assignee: August DeFazio, Darlington, Pa.

[21] Appl. No.: 257,999

[22] Filed: Oct. 17, 1988

[51] Int. Cl.$^5$ .................. G03H 1/02; A45D 42/04; A45D 33/18; B29D 11/00
[52] U.S. Cl. .......................... 359/3; 359/1; 359/32; 132/293; 132/301; 264/1.3
[58] Field of Search ............ 350/3.6, 3.61, 3.66, 350/3.85; 264/1.3; 132/293, 301; 359/1, 3, 9, 32

[56] References Cited

U.S. PATENT DOCUMENTS

| | | | |
|---|---|---|---|
| 2,839,378 | 6/1958 | McAdow | 204/10 X |
| 3,619,024 | 11/1971 | Frattarola | 264/1.3 |
| 4,211,617 | 7/1980 | Hunyar | 204/5 |
| 4,321,087 | 3/1982 | Levine et al. | 264/81 X |
| 4,339,168 | 7/1982 | Haines | 359/12 X |
| 4,405,670 | 9/1983 | Labib | 346/137 |
| 4,421,380 | 12/1983 | McGrew | 350/3.76 |
| 4,422,904 | 12/1983 | Wilkinson | 204/5 |
| 4,430,401 | 2/1984 | Wilkinson | 204/5 X |
| 4,500,392 | 2/1985 | Slaten | 204/5 |
| 4,500,486 | 2/1985 | Rascle et al. | 425/437 X |
| 4,668,523 | 5/1987 | Begleiter | 350/3.8 |
| 4,677,285 | 6/1987 | Taniguchi | 235/488 |
| 4,684,795 | 8/1987 | Colgate | 283/904 X |
| 4,717,221 | 1/1988 | McGrew | 350/162.18 |
| 4,725,111 | 2/1988 | Weitzen et al. | 350/3.6 |
| 4,758,296 | 7/1988 | McGrew | 264/1.3 |
| 4,829,319 | 5/1989 | Chan et al. | 346/1.1 |
| 4,840,444 | 6/1989 | Hewitt | 350/3.6 |
| 4,913,504 | 4/1990 | Gallagher | 350/3.6 |
| 4,933,120 | 6/1990 | D'Amato et al. | 264/1.3 |

OTHER PUBLICATIONS

Unterseher, F., Hansen, J. and Schlesinger, B *The Holography Handbook* 1982 pp. 123, 250–256 and 282–287.
Iwata, Fujio and Tsujiuchi, Jumpei "Characteristics of a Photoresist Hologram and Its Replica" *Applied Optics* vol. 13, No. 6, Jun. 1974, pp. 1327–1336.

Primary Examiner—Bruce Y. Arnold
Assistant Examiner—David Parsons
Attorney, Agent, or Firm—Connolly & Hutz

[57] ABSTRACT

Holograms are formed in moldable materials of varied shapes and curvatures utilizing injection molding and the like. Instead of the conventional metallizing, there can be sprayed on flakes of highly specular metal made by breaking up a thin coating of metal metallized by conventional metallizing on a removable support. Hologram on one surface of a molding that has a 100% mirror on an opposing surface, is suitable for cosmetic compact case covers or the like. Holograms can also be applied to digital compact audio discs or video discs.

11 Claims, 1 Drawing Sheet

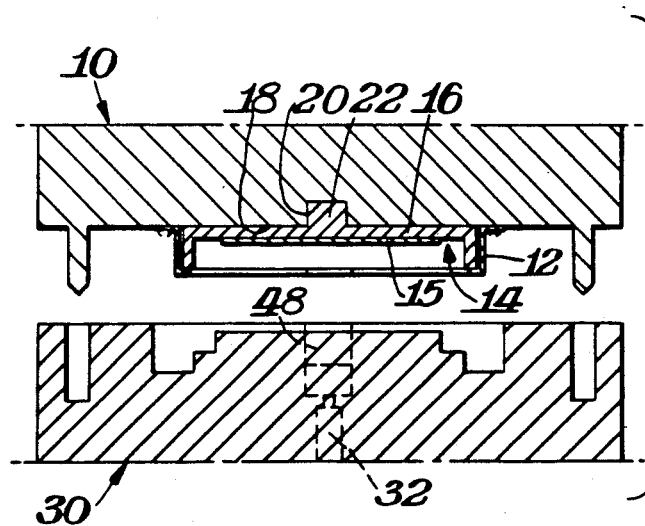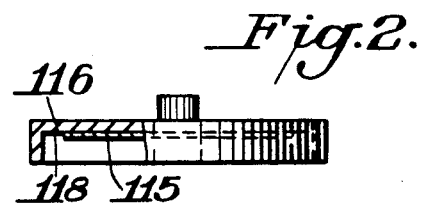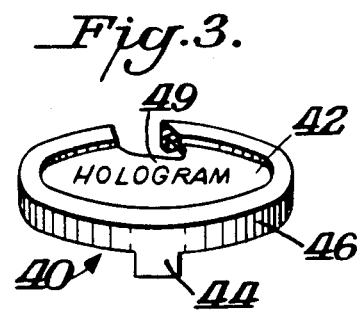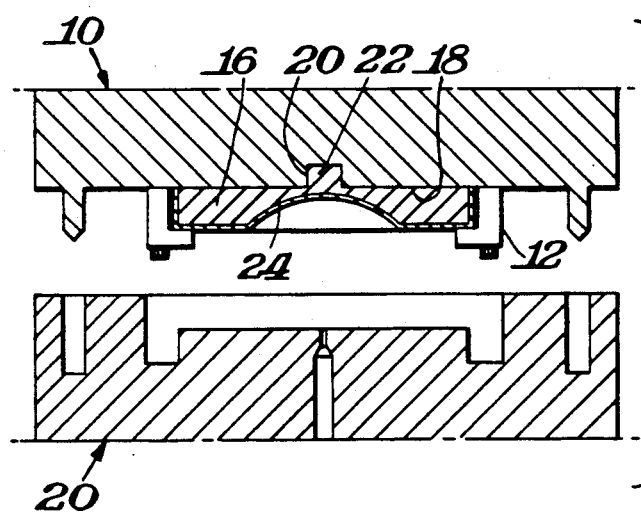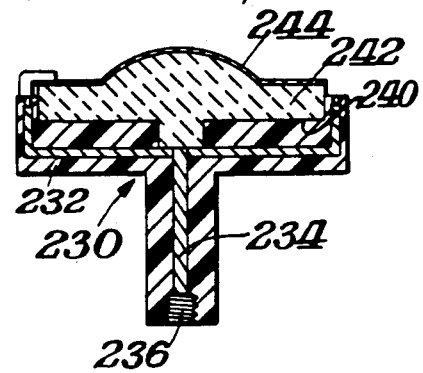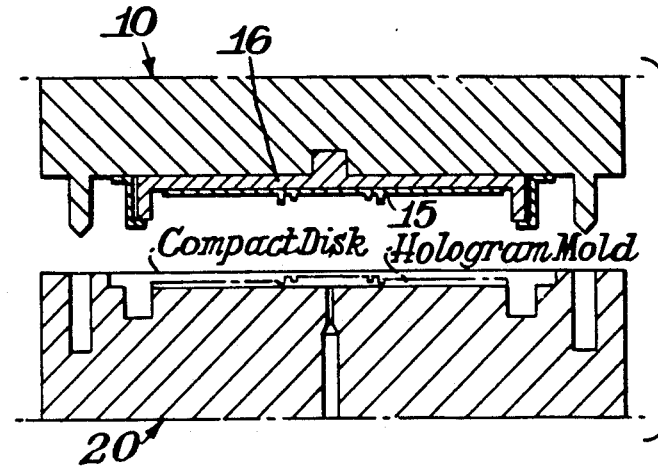

HOLOGRAM PRODUCTION

The present invention relates to the reproduction of holographic images and the like, particularly relief type holograms for viewing by ordinary or incoherent light.

Among the objects of the present invention is the inexpensive production of holographic images and of objects containing such images.

Additional objects of the present invention include the reproduction of objects that are not suitable to be reproduced by an embossing technique.

The foregoing as well as still further objects of the present invention will be more fully understood from the following description of several of its exemplifications, reference being made to the accompanying drawings, wherein FIG. 1 is a schematic vertical section of an injection molding set-up pursuant to the present invention;

FIG. 2 is a vertical section of a master or stamper as prepared for use in the molding set-up of FIG. 1;

FIG. 3 is a perspective view, partly broken away, of the injection-molded product;

FIGS. 4 and 5 are views similar to FIGS. 1 and 2, showing a modified set-up and

FIG. 6 is a view similar to FIG. 1 showing the hologram formed in the substrate material.

According to the present invention, there is supplied a holographic master containing on one face a hologram image that is a negative or a positive of the desired image. A thin metal stamper (shim) is electroformed from this master, this stamper is the metal die that withstands molding. The raw material (a transparent, translucent, or opaque plastic) is, in a molten state, molded against the image-containing face of the stamper, and then separated once the material has sufficiently hardened. The transferred image on the separated molding can be brought out or accentuated as by applying a coating such as that of a highly specular metal like aluminum, gold, copper or silver.

The molded-in image, when viewed from the molded surface, is a positive if the master was a negative; when viewed from the opposite face it is a negative if the master was a negative.

Alternatively or additionally such image can be accentuated by using colored plastic as the molding material.

The holographic master can be made by laser irradiation of a suitable blank or by forming metal over a hologram-containing original, as by the electroforming techniques described for example in U.S. Pat. Nos. 4,500,392, 4,500,486, 4,430,401, 4,211,617, 4,422,904. The master and subsequent shim or stamper has a surface shaped to mate with that of the desired final product. The shim or stamper can be treated so that it withstands molding and can be easily separated from a body molded against it.

Turning now to the drawings, FIG. 1 shows the two mold surfaces 10, 30 of an injection molder such as a Battenfeld 330 ton molder. Secured to surface 10 is a mounting ring 12 that holds a holograph stamper die 14 in place. The stamper has a metal, image-containing face 15 backed by a filler backing 16 such as a cast-in-place metal backer having a back face 18 that supports the master against the die surface 10. A recess 20 in surface 10 receives a projection 22 that extends out from the backer 16. Ring 12 is preferably arranged to permit the master to expand and contract a little as it is heated and cooled during the molding.

Master 14 and the opposing mold surface 18 are shaped to form a cup-shaped cover 40 for a ladies' cosmetic compact case, as illustrated in FIG. 3, when the mold surfaces are brought into closed position and molten plastic is injected through injection passageway 32. Cover 40 has a hologram molded into a recessed face 42 on its outer surface, and in the form shown has a hinge tab 44 projecting from a cylindrical rim 46. The plastic injection is also shown as effected directly into the space 48 for tab 44, so that the sprue left when the gated plastic is broken off, does not interfere with the appearance or use of the cover's inner surface 4 9 as a mirror or to hold a mirror.

Standard processes such as the photographic techniques described in the Holography Handbook by Fred Unterseher, Jeannene Hansen, and Bob Schlesinger copyright 1982, particularly pages 123, 250-56, and 282-87, as well as in the June 1974 issue of Applied Optics, pages 1327 through 1336, can be used to prepare the image master, and after transfer to a stamper, can be set up as illustrated in FIGS. 1 and 2. Here a master or stamper 115 is soldered, spot welded, cemented or otherwise adhered to the floor of a cup-shaped backer 116, to leave an annular groove 118 around the periphery of the master.

DESCRIPTION OF PREFERRED EMBODIMENTS

The dies of the present invention can have a variety of shapes, such as compound curvatures, or angular projections or recesses, as for example in the interior of a box, or have relatively deep recesses as in egg-shaped container halves. It is of course important that the molding die have a configuration suitable for forming molded products. Thus the object to be molded can be any moldable object such as a cylindrical or rectangular box top closure having a cylindrical or rectangular flange projecting from its margin to fit over or against the open top of a box. Some box tops such as the above-described ladies' cosmetic "compacts" usually have a mirror on their interior faces, and the metallizing of the present invention can supply such a mirror.

Any thermoplastic resin can be molded against the dies of the present invention, but polycarbonate is preferred because of its durability and clarity. Polyacrylates, polystyrenes and polycarbonate-polyester blends are alternate choices. Molding with resin feeds as hot as 300° C. is quite practical.

The molded articles should be at least about ½ millimeter thick, preferably at least about 1½ millimeters thick. Even smaller thicknesses will be adequate to show the desired hologram image, but will generally be flimsy.

The molded hologram image may not always be sufficiently distinctive in appearance. The distinctiveness is improved by having the molded plastic colored, black with a shiny surface for example, or by the more popular metallizing with a specular metal like aluminum. As generally practiced in the art, the metallizing of hologram-carrying plastics is effected by condensing a thin layer of aluminum on a surface of the plastic, from aluminum vapor boiled off heated aluminum at very low subatmospheric pressure—usually about $10^{-3}$ torr. Such a metallized layer can be as thin as about 10 Angstroms and therefore essentially transparent, or much thicker and essentially opaque. Under most conditions the hologram can be viewed clearly from either side of the metallizing. This is not necessarily the case where the metallizing is thin, e.g. less than 300 Angstroms, and the plastic is too heavily tinted.

The vapor-deposited metallizing is preferably about 1000 Angstroms thick. Greater thickness, can be used without significantly degrading the view from the metallized surface, but adds to the expense. Whether the metallizing be thin or thick, it is best covered with a protective coating such as clear acrylate lacquer or the like. Covering a face of a hologram with other types of opaque layers, leaves the hologram visible through its back.

According to the present invention, holograms however prepared are alternatively made more distinctive by coatings of specular metal flakes that can be readily sprayed on in the open atmosphere. Ordinary paint grade aluminum flakes are generally not sufficiently specular. Preferred flakes are those made from vacuum-metallized layers as described in U.S. Pat. Nos. 2,839,378 and 4,321,087, the contents of both being hereby incorporated herein as though fully set out. The thickness of such preferred flakes is controlled by controlling the thickness of the vacuum-metallized layer from which they are formed. Such a layer is metallized on a thin soluble resin pre-coat over a polyester film for example polyethylene terephthalate, and subsequently dissolved in a solvent to liberate the deposited metal. After such liberation the liberated metal is in the form of large sheets or sheet fragments, and is suspended in the resin-containing solvent or in any other solvent and subjected to treatment to reduce the surface area size of the fragments. This is easily effected by agitation as described in the noted patents, or by forcing such suspension through a homogenizer opening about 6 to 30 microns wide. The resulting flake suspension is then sprayed onto the hologram-carrying product, preferably with a binder resin such as an acrylate. Flake surfaces about 6-30 microns across are very effective.

It should be noted that the metal flake application of the present invention is much less expensive than direct vacuum metallizing of each hologram-carrying product inasmuch as the vacuum-metallizing to produce the flakes can be a continuous operation inexpensively carried out in a central location rather than an intermittent one in the field. Also the binder resin that is combined with the flakes makes it unnecessary for a protective covering.

According to another aspect of the present invention, hologram images of greater distinctiveness are obtained by injection molding against a hologram-containing molding die, a plastic containing distributed metal flakes. The preferred flakes for this purpose are those made from vacuum-metallized layers as described above, and concentrations of about 1 to about 10% by weight of metal flake in the molding resin are quite effective.

It may be desirable to isolate the Hologram region that for example may be transparent from the surrounding substrate or carrier that may be of opaque or a different material. This would entail a two material molding machine that would enable the two materials to fuse only at the requisite junctures.

Another method of effectively metallizing a molded holographic surface is to draw a continuous strip of thin specular metal foil between the mold halves when the mold is open. The mold will close on this strip, cutting out and depositing a metal layer between the stamper face and the molten plastic, effectively metallizing the holographic contoured face of the molded plastic substrate. The foil should be thin, and readily deformable. A gold foil about 5 microns thick works well.

FIG. 4 shows a different modification in which the holographic stamper (shim) has a non-planar shape. Thus master 24 has its central portion spherically concave. That shape and similar shapes are unsuitable for embossing. Merely pressing a master with such shapes against an embossable surface will satisfactorily transfer an image from the central portion of the concavity, but will not adequately transfer an image from the peripheral portion of the concavity.

Master 24 can be prepared along the same lines described above. FIG. 5 shows an alternative technique. Here a mandrel 230 is arranged to be fitted on the cathode bus of an electroforming circuit. The mandrel has an outer body 232 of electrical insulator such as polypropylene or polyethylene with a centrally fitted electrically conductive rod 234 having arms that are connected to the electrically conductive face 244 of a master die. A threaded socket 236 is arranged to be screwed onto a correspondingly threaded end on the bus.

The mandrel has a cup-shaped receiving recess 240 in which is held for example either a holographic glass master or a blank plastic base 242 for backing a metal stamper 244 the outer face of which carries the desired hologram image and is slightly oxidized. Subjecting it to the cathodic electrode position of the electroforming process deposits on oxidized surface 244 a thin layer of metal such as nickel that follows all the surface variations that form the holographic image and withstands molding. An electroformed layer about 100 microns to about 750 microns thick is generally adequate, after which the electroformed layer is carefully pulled away from the master or original stamper.

A curved or angular hologram stamper can be prepared from a planar master, by deforming it into the desired shape.

It is frequently desirable to prepare two or more such molding dies, in the event one is damaged or worn out through use, or if more than one molding line is used. The additional dies can be prepared from the electroforming master 242, or from a molding die 24. The latter technique is carried out by using die 24 as an electroforming master to electroform a negative die, and then to use such a negative die to electroform a positive die. It is important to treat the die surface to keep it from too strongly adhering to the electroformed copy or to the injection molded resin. Thus a nickel-faced die can be dipped in an aqueous solution of a suitable oxidizer such as potassium dichromate for about one minute to slightly oxidize the die surface.

A further modification of the present invention is the application of a hologram to a digital compact audio or video disc at the same time as the disc is molded. Such discs are resin plastics molded against master or stamper dies that impress into the discs a spiral track of audio-generating or video-generating indentations that extend over most of a disc face. A printed-on legend is applied over the indentation-carrying face of the disc to function as a label or for decorative purposes. Normally the recording is played back by a laser reading the indentations from the opposite face and through the disc.

According to the present invention a hologram image is molded into the disc along with the information-representing indentations, so that the hologram can supplement or take the place of the labelling or act as a form of decoration. To this end the stamper die is formed with both the audio or video information-representing indentations and a hologram relief surface, as shown in FIG. 6. There is generally, for example, about 15 millimeters of blank radial space around the center of a compact audio disc, and about 4 millimeters of blank radial space around the periphery of such disc, that can receive a hologram image which does not complicate the recording or playback. The discs are transparent so that the hologram can be seen from the face opposite the recording-carrying face. After the information/-relief-carrying face is metallized as in the normal production technique, the hologram is particularly clear when viewed from the reverse face or from the molded face. The view from the molded face is degraded by sprayed-on metallizing, and the sprayed-on metallizing particles are best of small area, such as 6 microns in width, to diminish the degradation.

The hologram relief can be superimposed onto the audio or video information surface, the relief having depths varying between 20 and 100 nanometers, preferably 20 to 30 nanometers, and not significantly interfering with the normal reading of the encoded digital information, which is generally in the form of spaced pits about 120 nanometers deep. Metallizing of such a superimposed record will leave a hologram easily visible from both faces of the metallized disc, even though the metallizing is heavy enough to constitute an opaque layer. The resulting hologram can accordingly occupy the entire molded surface of the disc.

While resin plastics are generally the most convenient molding materials used to hold holograms, other molding materials such as glass, transparent candy and even gelatin can be used. In each case the molding technique is adapted to the melting and solidifying characteristics of the material molded. Metallizing can also be used for all such materials, silver or gold being desirable metallizing metals for candy and other edible material.

Obviously many modifications and variations of the present invention are possible in the light of the above teachings. It is, therefore, to be understood that within the scope of the appended claims the invention may be practiced otherwise than as specifically described.

We claim:

1. A transparent solid body having embedded in it a hologram image, and also carrying a quantity of dispersed finely-divided specular metal flakes that make the image more distinctive.

2. In the method of molding of a digital compact audio or video disc against a stamper containing a negative of the information the disc is to carry the improvement according to which the stamper also contains indicia which molds a hologram into the disc.

3. A hologram surface that is made more distinctive by a thin layer of aluminizing, in which the aluminizing is a sprayed-on layer of thin aluminum flakes from a suspension of those flakes in a vaporizable solvent.

4. A molded one-piece non-planar cover of a cosmetic compact having an integral transparent outer surface in which a hologram image is contained and is viewable, said cover having an inner surface that is specularly reflective.

5. An article according to claim 4 in which the specularly reflective surface is an integrally molded part of the molded article.

6. An article according to claim 4 in which the specularly reflective surface is a cosmetic mirror.

7. In a process of applying a hologram to a substrate, the improvement being in enhancing the hologram by applying finely divided specularly reflective metal flakes to the substrate.

8. The process of claim 7 in which the substrate is polycarbonate plastic.

9. The process of claim 7 wherein the metal flakes are applied by being sprayed-on to form a layer.

10. The process of claim 7 wherein the metal flakes are applied by being dispersed in the substrate.

11. In the process of molding a plastic compact disc for storing audio or video information, the improvement comprising molding holographic image information on a face of the plastic disc simultaneously with the molding of the plastic disc.

* * * * *